United States Defensive Publication [19] (H) [11] T964,005

Coates, Jr. et al. [43] Nov. 1, 1977

[54] MONOAZO DYE MIXTURES

[76] Inventors: Clarence A. Coates, Jr., Rte. 8; Gary T. Clark, 513 Montezuma Road, both of Kingsport, Tenn. 37664

[21] Appl. No.: 776,457

[22] Filed: Mar. 10, 1977

[51] Int. Cl.[2] ..... C09B 29/26; D06P 3/36; D06P 3/52

[52] U.S. Cl. ..... 8/26; 260/207

[57] ABSTRACT

Mixtures of monoazo dyes having at least one dye of the formula

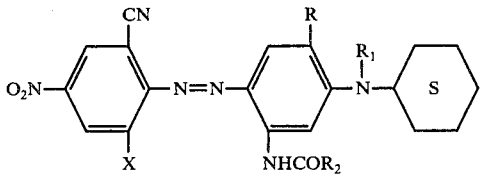

and at least one dye of the formula

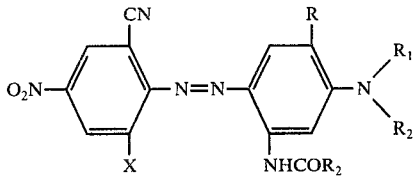

wherein X is chlorine, bromine, alkylsulfonyl of 1 to 6 carbon atoms, CN, $CF_3$ or $NO_2$; R is hydrogen or alkyl or alkoxy of 1 to 6 carbon atoms; $R_1$ is hydrogen, alkyl or alkoxy of 1 to 6 carbon atoms or alkyl of 1 to 6 carbon atoms substituted with phenyl, hydroxy or alkanoyloxy of 1 to 6 carbon atoms; $R_2$ is hydrogen, cyclohexyl, phenyl, alkoxy or alkyl of 1 to 6 carbon atoms or alkyl of 1 to 6 carbon atoms substituted with phenyl, chloro, phenoxy or alkoxy of 1 to 6 carbon atoms; and $R_3$ has the same meaning as $R_1$ excluding hydrogen. These mixtures produce bright, fast blue shades on polyester fibers having excellent fastness to light, wash, crock, gas, acid or base perspiration and sublimation. These mixtures have excellent pH stability over a range of 4–8 when applied to polyester above the boil, typically 220° to 275° F. These mixtures have superior build-up characteristics, color yield, exhaustion on to the fiber, leveling, barre coverage and rate of dyeing and have excellent shade reproducibility. The excellent saturation values and faster rates of dyeing are economically advantageous to the dyer.

4 Claims, No Sheets Drawing,

10 Pages Specification

The file of this unexamined application may be inspected and copies thereof may be purchased (849 O.G. 1221, Apr. 9, 1968).